(12) United States Patent
Marndi et al.

(10) Patent No.: US 8,204,887 B2
(45) Date of Patent: Jun. 19, 2012

(54) SYSTEM AND METHOD FOR SUBSEQUENCE MATCHING

(75) Inventors: Raj Narayan Marndi, Karnataka (IN); Sachin Daniel Oommen, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 12/870,129

(22) Filed: Aug. 27, 2010

(65) Prior Publication Data
US 2012/0054196 A1 Mar. 1, 2012

(51) Int. Cl.
*G06F 17/30* (2006.01)
(52) U.S. Cl. .................................. 707/745; 707/797
(58) Field of Classification Search .................. 707/745, 707/797
See application file for complete search history.

(56) References Cited

U.S. PATENT DOCUMENTS

| | | | |
|---|---|---|---|
| 5,857,196 A | 1/1999 | Angle et al. | |
| 6,047,283 A | 4/2000 | Braun | |
| 7,475,070 B2* | 1/2009 | Fan et al. .............................. | 1/1 |
| 7,797,324 B2* | 9/2010 | Miyoshi ......................... | 707/741 |
| 2004/0128288 A1* | 7/2004 | Cancedda ......................... | 707/4 |
| 2006/0161575 A1* | 7/2006 | Fan et al. ........................ | 707/102 |
| 2008/0243784 A1* | 10/2008 | Stading ............................. | 707/3 |
| 2008/0243787 A1* | 10/2008 | Stading ............................. | 707/3 |
| 2008/0243836 A1* | 10/2008 | Miyoshi ........................... | 707/5 |
| 2008/0244429 A1* | 10/2008 | Stading ......................... | 715/764 |

* cited by examiner

*Primary Examiner* — Jean M Corrielus (57) ABSTRACT

An embodiment of providing a computer-executed method of subsequence matching is provided. The method comprises receiving a search string. A plurality of subsequences for the search string are stored in a tree structure. The tree structure comprise a plurality of nodes. Each of the plurality of nodes comprises a presence bit map, a sequence bit map, and a list of address pointers. The method further includes traversing the tree structure using the search string, the presence bit map, the sequence bit map, and the list of address pointers. Additionally, the method includes identifying, in linear time, the plurality of subsequences based on the search string, the presence bit map, the sequence bit map, and the list of address pointers.

20 Claims, 11 Drawing Sheets

| Node | PBM (Flags Set) | COE | LAP |
|------|------|------|------|
| 202 | B , F | ∅ | 204 , 206 |
| 204 | G , L | I | 208 , 210 |
| 208 | ∅ | ∅ | ∅ |
| 210 | ∅ | LS | ∅ |
| 206 | ∅ | ARM | ∅ |

| Node | PBM | COE | LAP |
|---|---|---|---|
| 502 | C | Ø | 504 |
| 504 | Ø | RT | Ø |

FIG. 6A

| Node | PBM | COE | LAP |
|---|---|---|---|
| 502 | C , T | Ø | 504 , 506 |
| 504 | Ø | RT | Ø |
| 506 | Ø | BL | Ø |

FIG. 6B

| Node | PBM | COE | LAP |
|---|---|---|---|
| 502 | C , T | Ø | 508 , 506 |
| 504 | Ø | T | Ø |
| 508 | R , S | Ø | 504 , 510 |
| 510 | Ø | D | Ø |
| 506 | Ø | BL | Ø |

SYSTEM AND METHOD FOR SUBSEQUENCE MATCHING

BACKGROUND

A subsequence is a sequence of a subset of elements within an original sequence, where the elements of the subsequence are in the same order as the original sequence. For example, when the original sequence is a sentence, the elements may be the words of the sentence. The subsequence may be a collection of one or more words from the sentence in the same order as the words appear in the sentence.

Thus, when the original sequence is a string, i.e., a keyword, the subsequence may be a sequence of characters within the keyword, where the characters of the subsequence are in the same order as that of the original keyword. In other words, for a given string, S, a substring, S', includes a subset of characters of S. In addition, the characters in S' are in the same sequence as the characters are found in S. The characters in S' need not, appear consecutively in S. For example, the string, "anna," is a subsequence of the string "banana", even though the characters in the string "anna" do not appear consecutively in the string "banana."

The matching of subsequence strings is widely used in variety of applications. Examples of areas in which subsequence string matching can be used include indexing XML data, matching patterns in compressed text, graphing databases of chemical compounds, matching patterns in district time series data and mining data. Subsequence string matching is also a basic operation in bioinformatics. For example, DNA sequencing, protein interactions, and protein analysis are areas in which subsequence string matching may be useful.

Subsequence matching may also be used to identify events or activities of interest in a large database that stores long sequences of activities. Moreover, the matching of subsequence strings may be used to determine document similarity. In such an application, subsequence string matching may be based on matching subsequences of words instead of characters.

The typical algorithms used to solve subsequence matching problems are measured in terms of time complexity. The time complexity of an algorithm is a way to describe the amount of time taken by an algorithm to solve a problem. Typically, time complexity is described as a function on the size of the input to the problem. In the case of subsequence matching, the size of input may be considered as the number of characters in the input string.

Time complexity is commonly estimated by logically counting the number of elementary operations performed by the algorithm, where an elementary operation takes a fixed amount of time to perform. Existing solutions to subsequence matching problems have time complexity of $O(n^2)$. This high level of complexity is computationally expensive, especially for large problems.

BRIEF DESCRIPTION OF THE DRAWINGS

Certain embodiments are described in the following detailed description and in reference to the drawings, in which.

DETAILED DESCRIPTION

Figure 1:
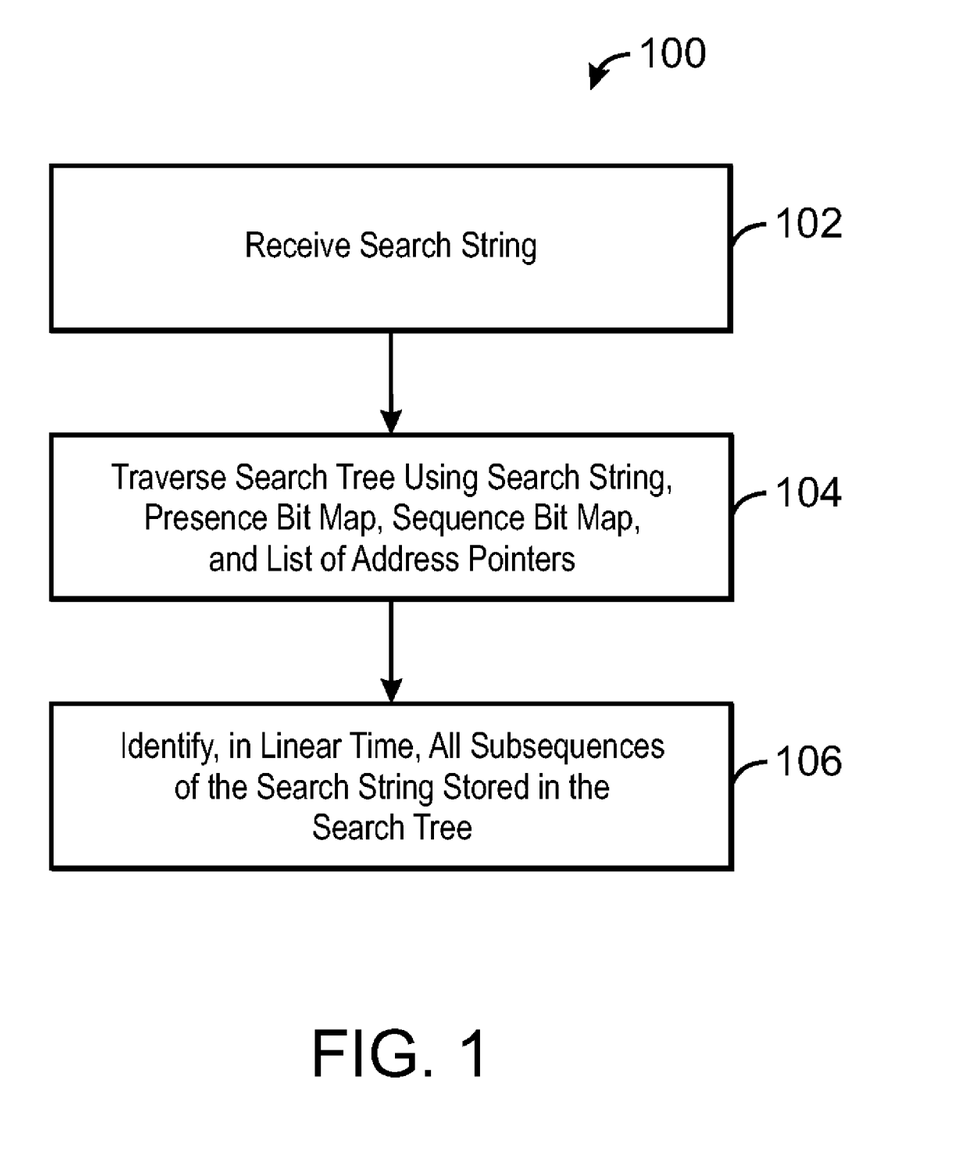
FIG. 1 is a process flow diagram showing a computer-executed method for performing subsequence matching according to an embodiment of the present invention.

FIG. 1 is a process flow diagram showing a computer-executed method for performing subsequence matching according to an embodiment of the present invention. The method is generally referred to by the reference number 100, and may be performed by the tree manager 928. It should be understood that the process flow diagram is not intended to indicate a particular order of execution.

The method may begin at block 102. At block 102, the tree manager 928 may receive a search string. The search string may be submitted by a user that is requesting a list of all subsequences of the search string that are stored in the search tree 924.

At block 104, the tree manager 928 may traverse the search tree 924 using the search string, the presence bit map 214, sequence bit map 216, and list of address pointers 218. As stated previously, each node of the search tree 924 may represent one or more characters of a subsequence. The search tree 924 may be traversed by selecting child nodes representing specific characters of a particular subsequence. The presence bit map 214 may indicate the presence of characters in corresponding child nodes. The sequence bit map 216, in combination with the list of address pointers, may point to specific addresses for the corresponding nodes.

At block 106, the tree manager may identify, in linear time, all the subsequences of the search string that are stored in the search tree 924. By traversing the search tree 924 as specified above, the tree manager 928 may identify leaf or other end nodes representing a stored subsequence. In one embodiment of the invention, the identification may be achieved in linear time, with respect to the length of the search string.

Advantageously, performing the bitwise AND operation on the presence bit map 214 and the valid bit map reduces the number of character comparisons of a typical subsequence search by a factor of the input keyword length. This reduction of character comparisons facilitated by an embodiment desirably allows searches for subsequences in a search string to be performed in linear time, as opposed to exponential orders of time. Thus, an embodiment may provide a reduction in computational expense of performing searches for subsequences.

Other approaches may allocate uniform memory to accommodate all possible child nodes in the search tree 924. Typically, much of this memory is never used, and henceforth wasted. In contrast, the tree manager 928 does not reserve addresses for non-existing child nodes. Further, the use of sequence bit map 216 and the list of address pointers 218 may ensure that the address of a desired child node can be obtained by direct access with a minimal use of storage.

Figure 2A:
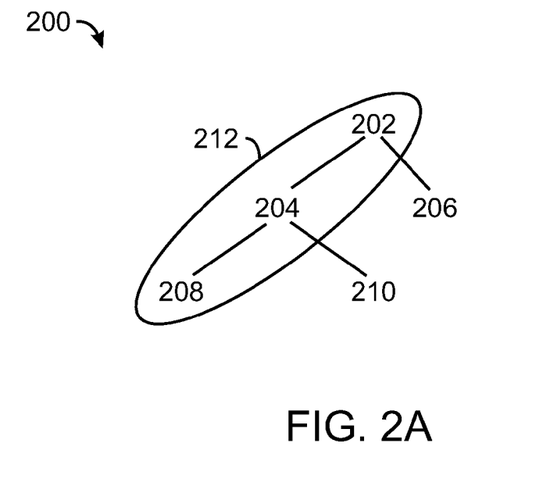
FIG. 2A is a block diagram showing a search tree according to an embodiment of the present invention.

FIG. 2A is a block diagram showing a search tree 200 according to an embodiment of the present invention. As shown, the search tree 200 may include nodes 202, 204, 206, and 208.

The search tree 200 is also referred to herein as a Meteor Tree. The name may be derived from the similarity of the nodes with meteors. Similar to meteors that have almost same size heads and different length of tails, every node in this tree may have a fixed size part and a variable size part. The fixed size part may contain a presence bit map, sequence bit map, keyword end node and a LEAF bit. The variable size part may contain characters over edge and lists of address pointers.

The node 202 may represent a root node of the search tree 200. As such, the root node may represent a starting point for the tree manager 928 to add strings, or search for subsequences.

Each of the nodes in the tree may represent at least one character of a stored string. As such, a path through the search tree 200 may represent a stored string. For example, node 202 may represent the character, "B," node 204 may represent the character, "I," and node 208 may represent the character, "G." Accordingly, the path 212, which includes nodes 202, 204, and 208, may represent the string, "BIG."

In an embodiment of the invention, the strings in the search tree 200 may be stored in end nodes. An end node is a node where a string ends that may be a leaf node or a non-leaf node. In the example described above, the string, "BIG," may be stored in the leaf node 308.

In another embodiment of the invention, each of the nodes may be associated with a set of data structures, including arrays and tables. The tree manager 928 may use the associated data structures to store and search the strings stored in the tree 200.

Figure 2B:
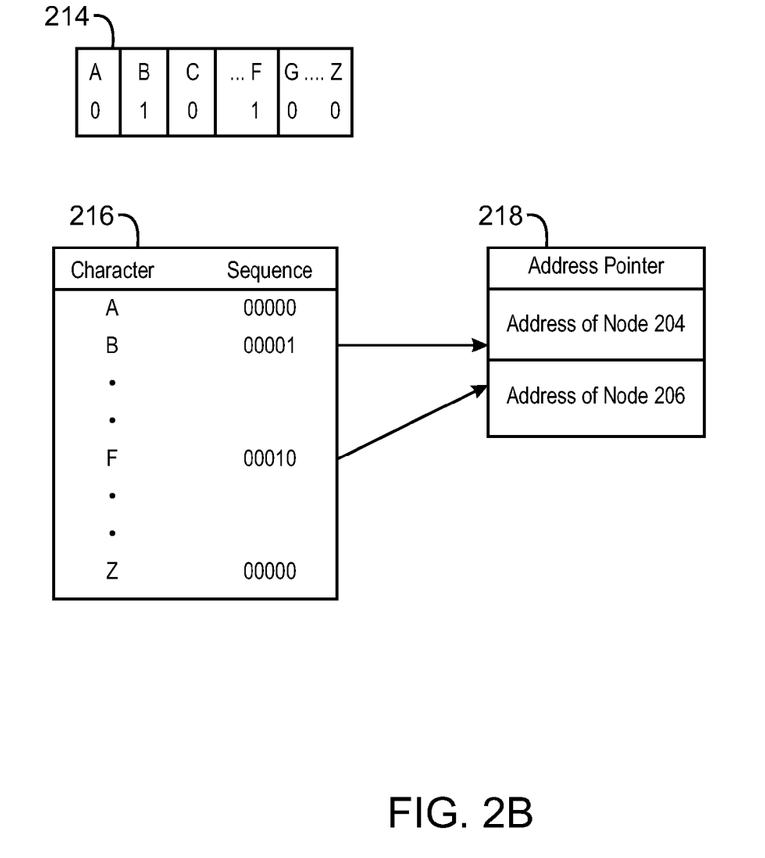
FIGS. 2B-2C are diagrams showing the contents of tables of the search tree according to an embodiment of the invention.

FIG. 2B is a diagram showing the contents of the associated tables of the search tree 200 according to an embodiment of the invention. As shown, each node may be associated with a presence bit map 214, a sequence bit map 216, and a list of address pointers 218. For the purpose of discussing the presence bit map 214, sequence bit map 216, and the list of address pointers 218, the tree 200 will be described as containing the strings, "BIG," "BILLS," and "FARM."

The presence bit map 214 may be a bit array with a size equal to the maximum fan out of the search tree 200. For example, where the search strings are formed from the English alphabet, the presence bit map 214 may be 26 bits long, one bit for each possible character of the alphabet. In an embodiment that stores genetic strings, the presence bit map 214 may only include 4 bits, one bit for each of the possible A, T, C, and G values.

The presence bit map 214 for a particular node may indicate whether a child node starts with the character flagged by a particular bit. For example, the root node 202 may have one child node for each unique first character of the strings stored in the tree 200. As stated previously, the tree 200 includes "BIG," "BILLS," and "FARM." Accordingly, the unique first characters are "B" and "F." As such, the presence bit map 214 for node 202 may have a bit set for each of the characters, "B" and "F." As shown in FIG. 2B, the bit flags for characters, "B" and "F" are set to 1. The remaining bit flags are all set to 0.

In an embodiment of the invention, each of the nodes may be stored in a computer memory. As such, each node may have an address from where the node's data can be retrieved. For each node, the addresses of the children nodes may be stored in the list of address pointers 218. In an embodiment, the list of address pointers 218 may be an entry sequential array. In other word, the list of address pointers 218 may include address entries, arranged in a sequence corresponding to the sequence of their addition to the array. When a new child node is added to a particular node in the search tree 200, an address for that new child node may be added to the list of address pointers 218 for that particular node. In an embodiment of the invention, the list of address pointers may be reallocated dynamically to include the address of the new child node.

The sequence bit map 216 may be a table of bits of size f×$B_f$ [where f (row size) is the maximum fan-out of the search tree 200 and $B_f$ (column size) is the number of bits needed to represent f in binary] bits which is used to store the sequence numbers of the entries in list of address pointers. For example, 26 alphabetic characters may be represented in 5 bits. In another example, 4 characters used for genetic sequences, may be represented in 2 bits.

The sequence bit map 216 may be used to find address of a child node in the list of address pointers 218. The rows in the sequence bit map 216 may correspond to all possible child nodes represented in the same sequence in the presence bit map 214. For example, the presence bit map 214 has bits set for the "B" and "F" characters. Accordingly, the sequence bit map 216 has sequence numbers assigned in the rows of the sequence bit map 216 representing the "B" and "F" characters.

The bits in a row of the sequence bit map 216 may be set to indicate the sequence number of the entry in the list of address pointers 218 corresponding to the child node that the row is assigned to. As shown in FIG. 2B, the sequence number "00001" for character, "B," may be the sequence number in the list of address pointers 218 where the address is stored for node 204 (representing character "B"). Similarly, the sequence number "00010" for character "F" may be the sequence number in the list of address pointers 218 where the address is stored for node 206 (representing character "F").

The size of the sequence number in the sequence bit map 216 may be based on the fan out size of the search tree 200. In an embodiment of the invention, because 26 possible characters may fan out at each level of the tree, the sequence number may include 5 bits, which can point to $2^5$ (32) possible addresses. In the embodiment where the search tree 200 stores genetic strings, the sequence number may only include 2 bits for $2^2$ (4) possible addresses. However, the size of list of address pointers 218 may be based on the actual number of child nodes from a particular node. In an embodiment of the invention, the tree manager 218 may assign additional memory for the list of address pointers 218 dynamically when a new node is added. As such, the tree manager 218 may not reserve additional memory for the list of address pointers 218 before the memory is used.

Each node may also include a "Characters Over Edge" string, a keyword end node bit, and a LEAF bit. The characters over edge of a node may contain a list of characters that are common for all the child nodes following the corresponding character in presence bit map 214 of the parent node. If there is no such character, then characters over edge for the node may be null. The characters in the characters over edge may appear in the same sequence as the characters appear in the stored string. The keyword end node bit of a node may indicate whether a string ends at that node. The LEAF bit may indicate whether the associated node is a leaf node of the tree 220. The characters over edge, keyword end node bit, and LEAF bit are explained in greater detail with reference to FIG. 2C.

Figure 2C:
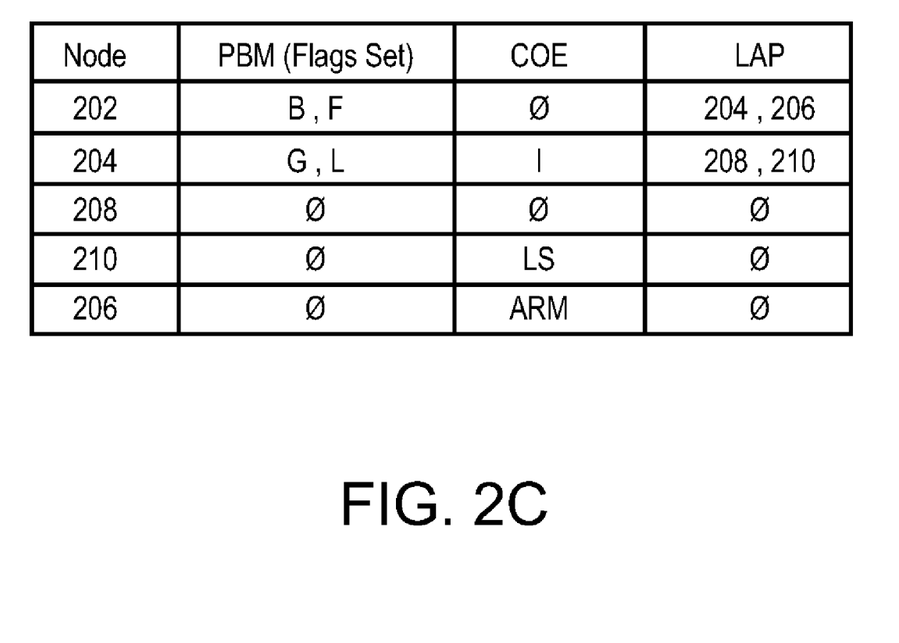

FIG. 2C is a diagram showing the contents of the presence bit map 214, characters over edge, and list of address pointers 218 for the search tree 200 containing strings "BIG", "BILLS" and "FARM" according to an embodiment of the invention. As shown, for node 202, the presence bit map 214 has bit flags set for characters, "B" and "F." The list of address pointers 218 for node 202 includes address pointers for nodes 204 and 206. The characters over edge for node 202 is empty because node 202 is the root node.

The node 204 has a characters over edge, "I," because the child nodes of the node 204, share "I" as a common character. It should be noted that the "B" is also a common character. However, in an embodiment of the invention, the characters over edge may only store the characters following the character in the presence bit map 214 that points to the current node. In this example, the character "B" is represented in the presence bit map 214 for node 202, which points to the current node 204.

The presence bit map 214 for node 204 has bit flags set for the characters, "G" and "L," representing the child nodes 208 and 210. Accordingly, the list of address pointers 218 for node 204 includes address pointers for nodes 208 and 210.

Nodes 206, 208, and 210 may represent leaves of the search tree 200 because these nodes 206, 208, and 210 have no child nodes. Accordingly, the presence bit map 214 and list of address pointers 218 for these nodes are empty. In an embodiment of the invention, the characters over edge may be used to store the remaining characters of strings stored in the search tree 200. As shown, the nodes 208, 210, and 206 have characters over edge's of "G," "LLS," and "ARM," representing the remaining characters of the strings "BIG," "BILLS," and "FARM," respectively.

In an embodiment of the invention, the presence bit map 214 may follow a keyword end node bit that may indicate whether a stored string is ending at the node, the keyword end node bit. If the keyword end node bit is set in a node, there may be a string ending at this node. In this way, nodes other than leaf nodes may represent the ending characters of a stored string. For example, if the string "BI," is stored in the search tree 200, the keyword end node bit may be set for node 204.

In an embodiment of the invention, the keyword end node bit may follow a bit called a LEAF bit. The LEAF bit may indicate whether the associated node is a leaf node of the search tree 200. If this bit is set to '1', the associated node is a leaf node, otherwise the bit is set to '0' indicating that is a non-leaf node. A leaf node may not contain presence bit map 214, sequence bit map 216 and list of address pointers 218. The leaf node may only contain characters over edge which again can be empty. This case may arise when the last character of the string ends as a bit entry in the presence bit map 214 of the parent node of the leaf node.

In an embodiment of the invention, the sequence of storage for the data structures associated with each node is as follows: keyword end node bit, LEAF bit, presence bit map 214, sequence bit map 216, list of address pointers 218 and characters over edge. The list of address pointers 218 and the characters over edge may be stored at the end of the data structures for the node as the list of address pointers 218 and characters over edge may require variable memory sizes.

A leaf node has no child node for which presence bit map 214, sequence bit map 216 and list of address pointers 218 values may be stored. Accordingly, the leaf nodes may not have associated presence bit map 214, sequence bit map 216, and list of address pointers 218 data structures. Thus when LEAF bit is set, the memory required by a node i.e. leaf node, is reduced.

Figure 3:
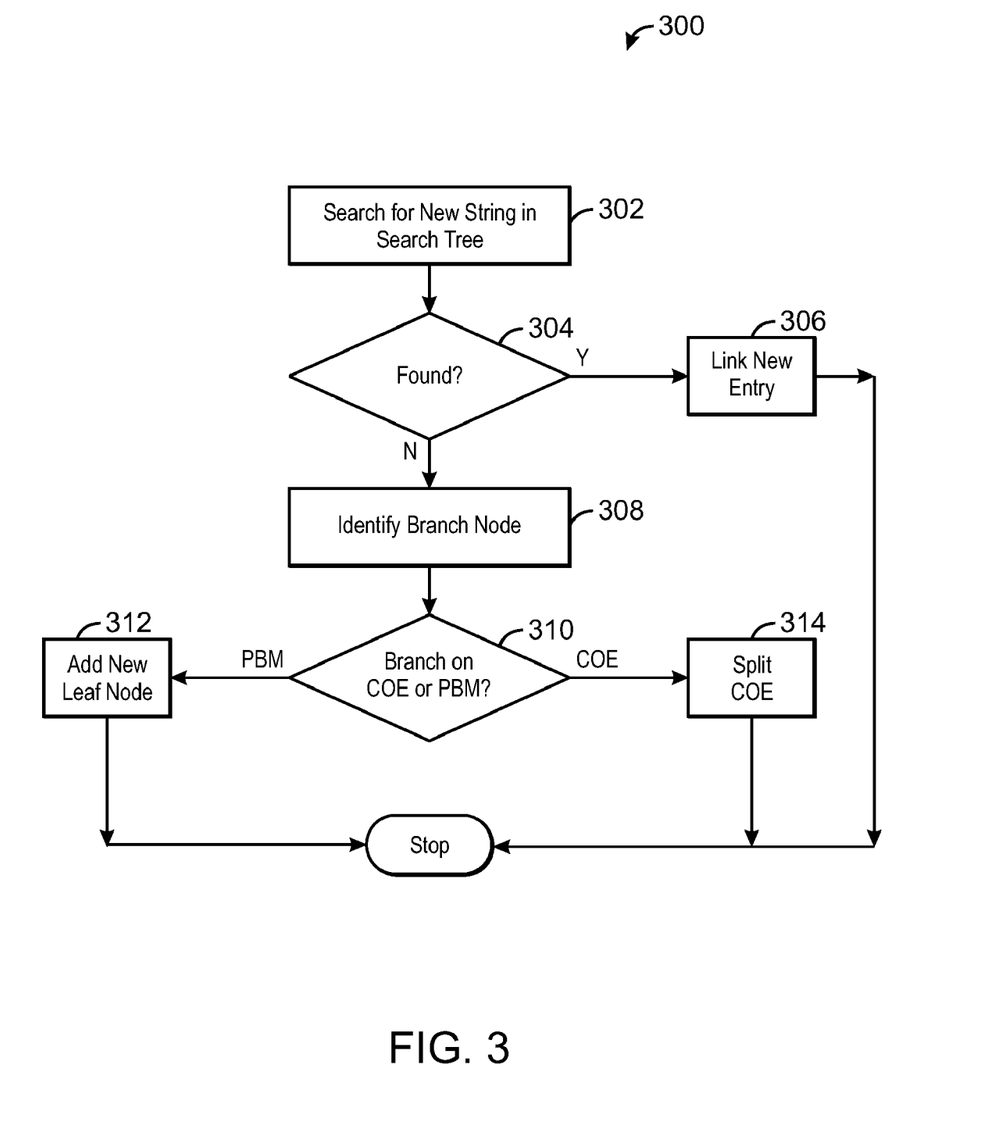
FIG. 3 is a process flow diagram showing a computer-executed method for storing a string in the search tree according to an embodiment of the present invention.

FIG. 3 is a process flow diagram showing a computer-executed method for storing a string in the search tree 924 according to an embodiment of the present invention. The method is generally referred to by the reference number 300, and may be performed by the tree manager 928. It should be understood that the process flow diagram is not intended to indicate a particular order of execution. The method 300 is discussed with reference to FIGS. 5A, 6A, 5B, 6B, 5C, and 6C, which are diagrams showing an example search tree 500 modified by the method 300.

Figure 5A:
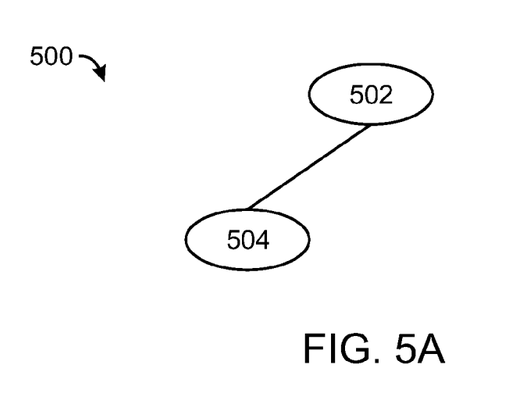
FIGS. 5A-5C are diagrams showing an example search tree that is modified according to an embodiment of the invention.

In this example, the search tree 500 may be a simple tree that includes one string, "CRT." As shown in FIG. 5A, the search tree 500 may include a root node 502, and a child node 504.

Figure 6A:
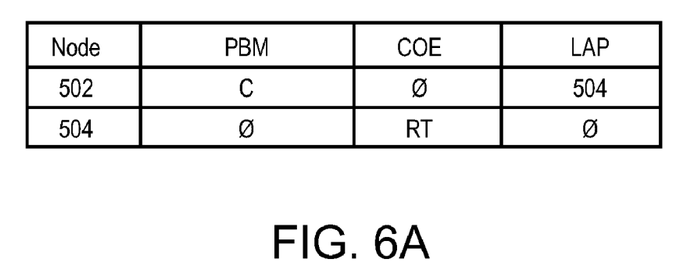
FIGS. 6A-6C are diagrams showing the contents of tables of the example search tree that is modified according to an embodiment of the invention.

FIG. 6A shows the contents of the presence bit map 214, list of address pointers 218, and characters over edge for the search tree 500. As shown, the presence bit map 214 may have a bit set for the "C" character. Although not shown, it should be noted that the sequence bit map 216 for node 502 may include a sequence number of "00001" for the character, "C." The sequence bit map 216 value for 'C' character "00001" indicates that the address of child node for character 'C' (i.e. node 504) is the first entry in its list of address pointers 218.

As shown, the node 504 contains the characters over edge value as "RT," representing the remaining characters of the "CRT" string. The presence bit map 214, sequence bit map 216, and list of address pointers 218 are empty because node 504 is a leaf node, having no child.

In this example of the method 300, a new string "TBL" may be added to the search tree 500. At block 302 in FIG. 3, the tree manager 928 may search for the new string in the search tree 500. In an embodiment of the invention, the search may be performed by exact matching on the contents of the presence bit map 214 and the characters over edge.

At block 304, the tree manager 928 may determine whether the new string is found in the search tree 500. If so, at block 306, the tree manager 928 may link a new entry to the node where the new string is found.

If the new string is not found, at block 308, the tree manager 928 may identify the branch node for the new string. The branch node may be a node in the search tree where the new string begins to differ from the search tree 500.

For example, the new string in this example, "TBL," begins to differ at the root node 502 because there is no bit set in the presence bit map 214 for the first character of the new string, "T." As such, the root node 502 is the branch node for the new string, "TBL."

At block 310, the tree manager 928 may determine whether the branch node differs from the remaining part of the search string at the characters over edge or at the presence bit map 214 of the branch node. If the branch node differs at the characters over edge, at block 314, the tree manager may split the characters over edge by inserting a new node at the position of the branch node. Splitting of the characters over edge is described in greater detail with reference to FIG. 4.

If, as in this example, the branch node differs from the input string based on the contents of the presence bit map 214, at block 312, the tree manager 928 may add a new child leaf node to the branch node. In an embodiment of the invention, the tree manager 928 may set the keyword end node bit and the LEAF bit of the new child leaf node. As the new child node, a leaf node does not have any children, the presence bit map 214, sequence bit map 216, and list of address pointers 218 may not exist for that node. However, the new node may include characters over edge. The characters over edge for the new node may include the characters of the new string that follow the first character where the new string differs from the branch node.

The branch node may be modified to indicate the new leaf node added to the search tree 500. More specifically, the bit corresponding to this newly added leaf node may be set in the presence bit map 214 of the branch node to indicate that there is a child node starting with this character. Further, changes in sequence bit map 216 and list of address pointers 218 are made for the entry of this new leaf node.

Figure 5B:
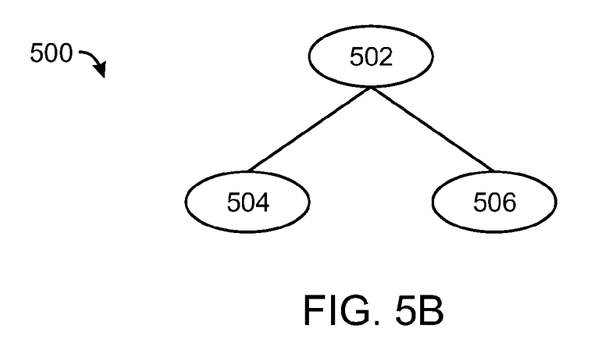

FIG. 5B shows the search tree 500 after a new node 506 is added, as described above. As shown, the new node 506 is a leaf node that is a child of the root node 502.

Figure 6B:
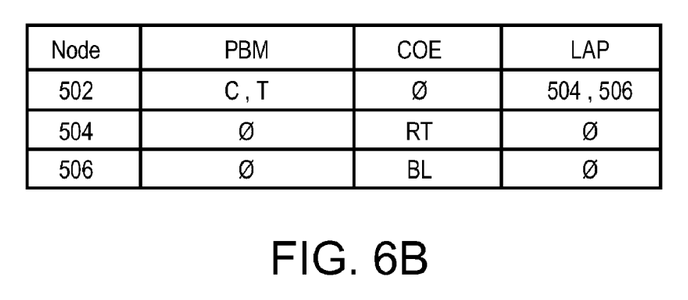

FIG. 6B shows the contents of the presence bit map 214, list of address pointers 218, and characters over edge for the modified search tree 500. In this example, the new string, "TBL," differs from the branch node at the first character of the new string, "T." As such, the new node 506 has a characters over edge value of "BL."

Additionally, the node 502 has a new bit set in the presence bit map 214 to indicate the first different character, "T." The node 502 also has a new entry in the list of address pointers 218 with the address pointer for the new node 506.

As stated previously, the list of address pointers 218 may be an entry sequential array. The sequence number in the list of address pointers 218 for the address pointer to node 506 may be "00010" (the next sequence number after "00001"). Additionally, the sequence bit map 216 (not shown) for the node 502 may be modified to include the new sequence number, "00010" for character "T".

Referring to FIG. 3, the method 300 will be described with reference to adding a new string, "CSD." At block 302, the tree manager 928 may search for the new string, "CSD," in the search tree 500.

At block 304, the tree manager 928 may determine that the new string, "CSD," is not in the search tree 500. At block 308, the tree manager 928 may identify the branch node. In this case, presence bit map 214 of the root node does have a bit set for the first character of the new string, "C." However, as shown in FIG. 6B, the node 504 has a characters over edge value of "RT." In contrast, the remaining characters of the new string are "SD." Hence, the tree manager 928 may identify the node 504 as the branch node for this new string.

At block 310, the tree manager 928 may determine that the branch node differs from the new string based on the characters over edge of the branch node. Accordingly, at block 314, the tree manager 928 may split the characters over edge of the branch node.

Figure 4:
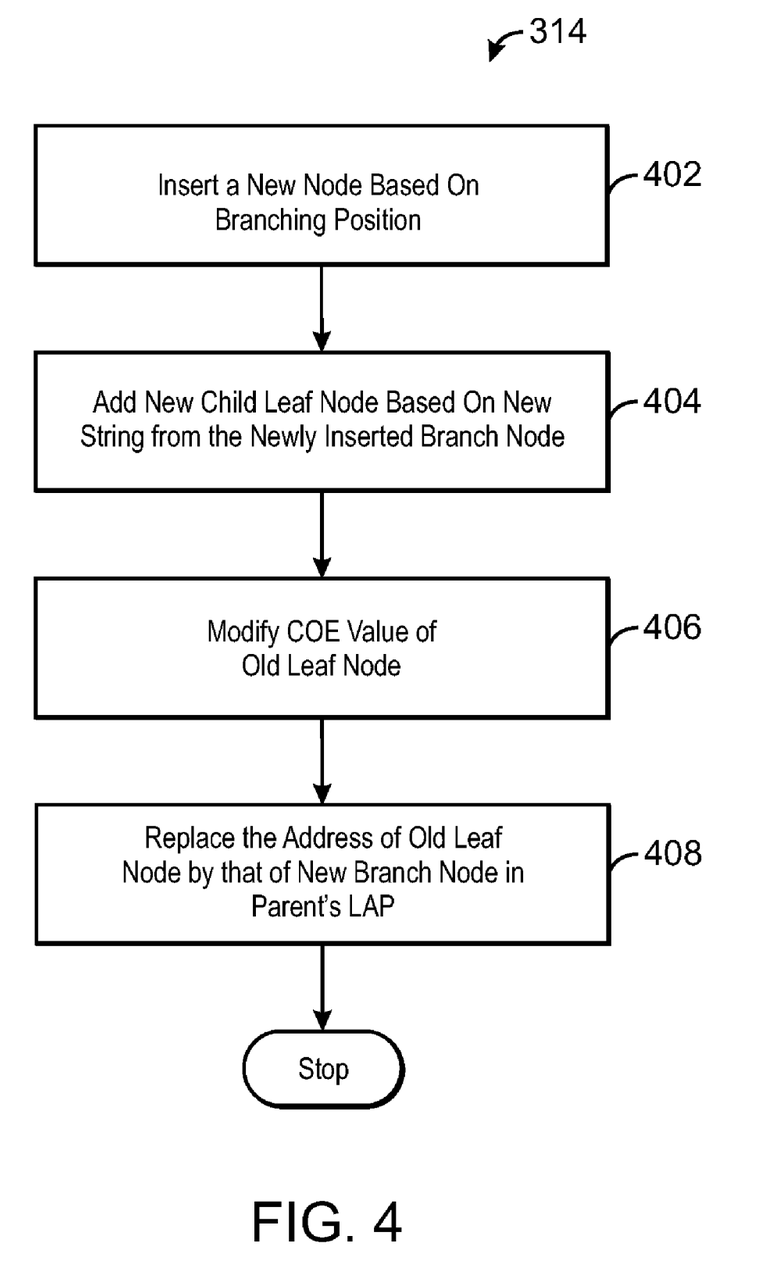
FIG. 4 is a process flow diagram for the block according to an embodiment of the present invention.

FIG. 4 is a process flow diagram for the block 314 according to an embodiment of the present invention. It should be understood that the process flow diagram is not intended to indicate a particular order of execution.

At block 402, the tree manager 928 may insert a new node based on the branching position. As the new node is a non-leaf node, it may include the presence bit map 214, sequence bit map 216, and list of address pointers 218. The characters over edge of the new node may be built taking the initial substring of characters over edge of branch node. More accurately, this substring may start from the first character of branch node characters over edge and ends before the branching position.

At block 404, the tree manager 928 may add a new child leaf node based on the new string from the newly inserted branch node.

Figure 5C:
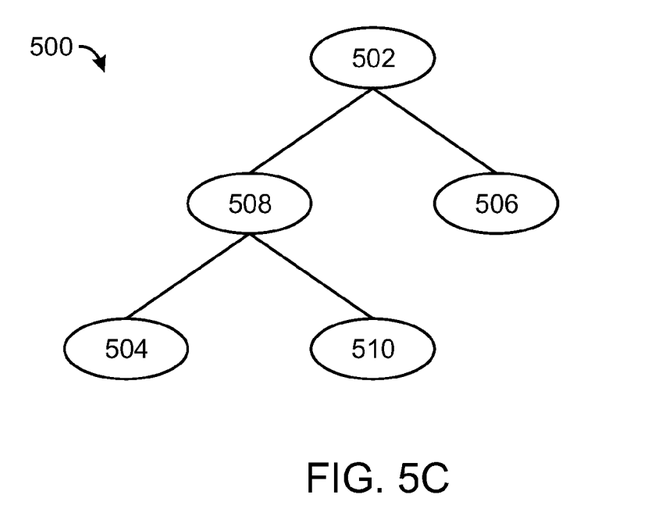

FIG. 5C shows the search tree 500 after the new nodes are added, as described above. In this example, node 508 may represent the new node inserted in the branching position. Additionally, the node 510 may represent the new leaf node based on the new string.

Referring back to FIG. 4, at block 406, the tree manager 928 may modify the characters over edge value of the old leaf node. Additionally, the presence bit map 214, sequence bit map 216, and list of address pointers 218 of node 508 may get assigned appropriate values to represent its two child nodes 504 and 510. Depending on the new string, the appropriate LEAF and keyword end node bits may also be set. In this case, these LEAF and keyword end node bits for node 508 may be set to 0 and that of node 510 may be set to 1

The characters over edge of the branch node 508 may be modified based on the common characters between its child nodes. In this case, the characters over edge of branch node 508 is null. Similarly, the characters over edge of child nodes 504 and 510 are set to the strings that follow the characters after the character in presence bit map 214 of branch node 508.

Figure 6C:
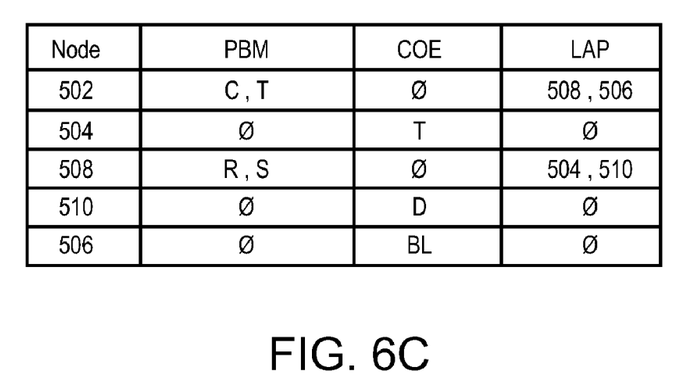

At block 408, the tree manager 928 may replace the address of the old leaf node by that of the new branch node in the list of address pointers 218 of the parent node (i.e. node 502 in FIG. 5C). FIG. 6C shows the contents of the presence bit map 214, list of address pointers 218, and characters over edge for the modified search tree 500. As shown, the modified search tree 500 includes the new nodes 508 and 510. The new node 508 contains presence bit map 214, sequence bit map 216 and list of address pointers 218. In contrast, the child nodes 504 and 510 contain only the characters over edge. It should be noted that all the nodes may include the keyword end node and LEAF bit flags.

Additionally, the branch node, node 508, has been modified to include set bits in the presence bit map 214 for characters, "R" and "S." These characters represent the first characters that differ between the characters over edge and the remaining characters of the new string.

The node 508 also includes entries in the list of address pointers 218 for the new nodes 504 and 510. Similarly, the entry for previous child node 504 in the list of address pointers 218 of parent node 502 may be replaced with address of branching node 508.

Figure 7:
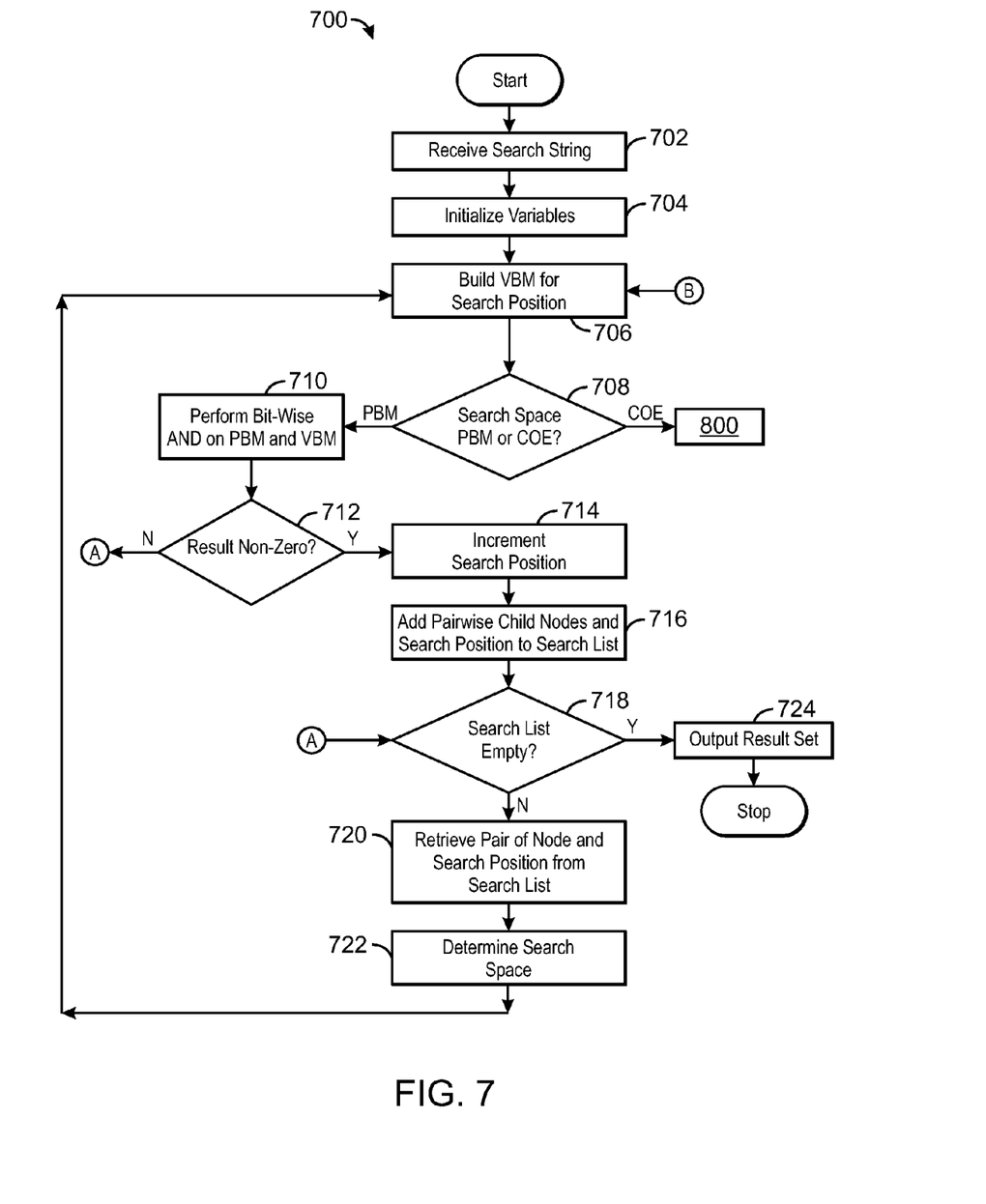
FIG. 7 is a process flow diagram for searching a search tree for subsequences of a search string according to an embodiment of the invention.

FIG. 7 is a process flow diagram for searching a search tree for subsequences of a search string according to an embodiment of the invention. The method is generally referred to by the reference number 700, and may be performed by the tree manager 928. In an embodiment of the invention, the tree manager 928 may be an executing software algorithm. It should be understood that the process flow diagram is not intended to indicate a particular order of execution.

The method 700 begins at block 702. At block 702, the tree manager 928 may receive the search string. Typically, software algorithms implement variables for intermediate calculations before a result is given.

At block 704, the tree manager 928 may initialize the variables for use in the search. For example, the search string may be stored as a variable used by the tree manager 928 to perform the search.

Other variables may also be initialized. Other variables may include a search space, a search position, and a search list. The search space may be specified as presence bit map or characters over edge, and may be used to make decisions about whether to perform a bitwise AND operation on the presence bit map 214, or to compare the characters over edge to the search string. At the beginning the search space may point to the presence bit map 214 of the root node 502.

The search position may specify where in the search string, a comparison is being made. For example, the third character of the search string may be compared to a specific character of the characters over edge. At the beginning the search position may be the first character of the search string.

A search list may track a list of nodes that potentially lead to subsequences of the search string. Along with the nodes, it may also stores the corresponding search position from the search string. In an embodiment of the invention, the search list may be an array of pairs having a resultant node and its search position.

At block 706, the tree manager 928 may generate a valid bit map for the search position. The valid bit map for a specified character in the search string is a bit map of the same size as the presence bit map 214. The valid bit map may have a bit set for each character that follows the character at the search position in the search string, referred to herein as the search character.

Given an example search string, "CREATE," the first character, "C," is followed by the characters, "R," "E," "A," and "T." Accordingly, the valid bit map for the first character has bits set for "R," "E," "A," and "T."

Figure 8:
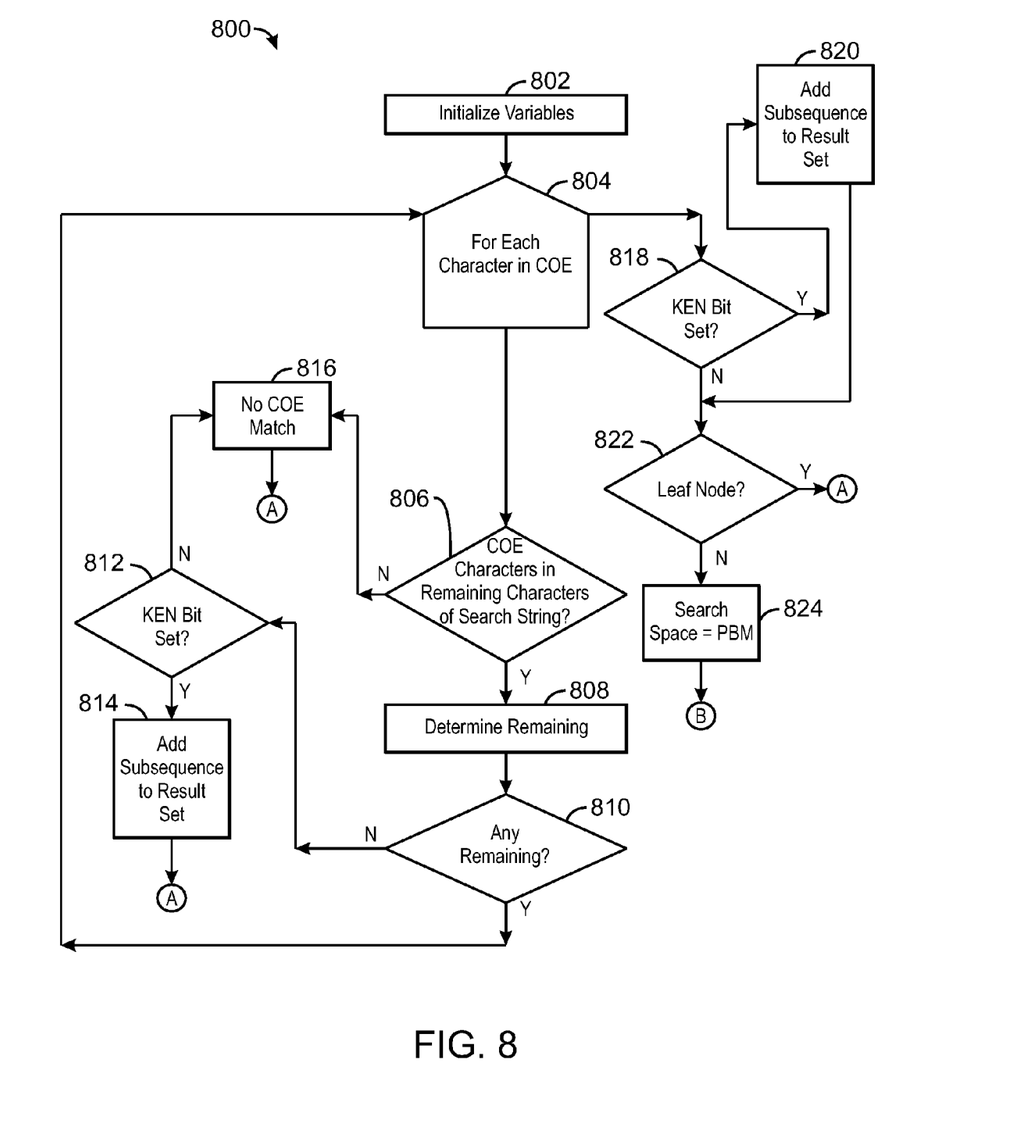
FIG. 8 is a process flow diagram for determining a characters over edge match according to an embodiment of the invention.

At block 708, the tree manager 928 may determine whether the search space is presence bit map or characters over edge. If the search space is characters over edge, the tree manager 928 may perform the method 800. As the tree manager 928 walks the tree 924, the method 800 may be used to compare the characters over edge of a current node to the search string. The method 800 may return a result indicating whether the characters over edge matches the search string.

If the search space is presence bit map, the tree manager 928 may, at block 710 perform a bitwise AND operation on the presence bit map 214 of the current tree node, and the valid bit map of the search character. In a first iteration of the method 700, the node used for comparison to the valid bit map is the root node, e.g., node 502, and the search character is the first character of the search string.

At block 712, the tree manager 928 may determine whether the result of the bitwise AND is non-zero. If not, the method 700 may flow to block 718. If the result of the bitwise AND is non-zero, at block 714, the tree manager 928 may increment the search position. The search position may be incremented by a default value, such as 1. In an embodiment of the invention, the search position may be incremented based on where in the search string a match occurs.

As stated previously, the presence bit map 214 contains the bits set for each child node of the current node. As such, the result of the bitwise AND operation may include bits set for all characters represented in both valid bit map and presence bit map. Accordingly, if the result is non-zero, the result may be used with the sequence bit map 216, and list of address pointers 218 of the current node to retrieve the child node corresponding to the bitwise-AND result.

It should be noted that the bitwise-AND result may include set bits for more than one child node. In such a case, the retrieval of all child nodes corresponding to the result may be performed in parallel.

At block 716, the tree manager may add to the search list all the child nodes indicated by the matches in the bitwise AND result. Also it stores the corresponding search character for the above child nodes. At block 718, the tree manager 928 may determine whether the search list is empty. It should be noted that other flows of the method 700 may lead to the block 718, where the search list may be depleted due to searches being completed.

If the search list is empty at block 724, the result set may be the final output. The result set may include all subsequences of the search string found in the search tree 924. If the search list is not empty, at block 720, the tree manager 928 may retrieve a pair of node and corresponding search character from the search list and may delete them from search list to avoid repeated retrieval.

At block 722, the tree manager 928 may determine the search space. The search space may be determined based on the characters over edge of the retrieved node. If the characters over edge is null, the search space may be set to presence bit map. If there is a characters over edge in the retrieved node (not null), the search space may be set to characters over edge. The method 700 may then flow to block 706.

FIG. 8 is a process flow diagram for determining a characters over edge match according to an embodiment of the invention. The method is generally referred to by the reference number 800, and may be performed by the tree manager 928. It should be understood that the process flow diagram is not intended to indicate a particular order of execution.

At block 802, the tree manager 928 may initialize variables such as a characters over edge search character, and remaining characters of the search string, herein referred to as the remaining. The remaining may include all characters remaining in the search string after the most recently matched.

The blocks 804 through 810 may be performed for each character in the characters over edge. As such, during each iteration, the characters over edge search character may be compared to the remaining.

At block 806, the tree manager 928 may determine whether the characters over edge search character is in the remaining. If not, there is no subsequence for the search string in the current branch of the search tree 924. As such, at block 816, a no characters over edge match result may be assigned. The method 800 then returns to block 718 of the method 700.

If, however, the characters over edge search character is in the remaining, at block 808, the tree manager 928 may determine the remaining after the first matched character of the search string. If the remaining from the search string does not contain any character at block 810, it may check another condition at block 812. At block 812, it may checks for value of keyword end node bit. If the keyword end node bit is set, which indicates that at least a string ends at this node, it may be concluded that there is a subsequence matching found. At block 814, the stored subsequence may be added to the result set. If the keyword end node bit is not set, then result may be concluded as this sub-tree may not lead to any matching and may be discarded from further comparison at 816. The method 800 then returns to block 718 of the method 700.

At the end of the loop at block 804, the tree manager 928 may determine whether the keyword end node bit has been set at retrieved child node in block 818. If the keyword end node bit is set, then, at block 820, it may be concluded that subsequence matching is found. At block 820, the stored subsequence may be added to the result set. After that at block 822, check may be performed for whether the child node is a leaf node. This may be also performed when keyword end node bit is found to be not set at block 818. At block 822, if it is found to be a leaf node, then the method 800 may return to block 718 of method 700. If it is not a leaf node, then at block 824, search space is set to be the presence bit map of the child node. Also search position may be assigned as the first character of the remaining. The method 800 then returns to block 706 of the method 700.

Figure 9:
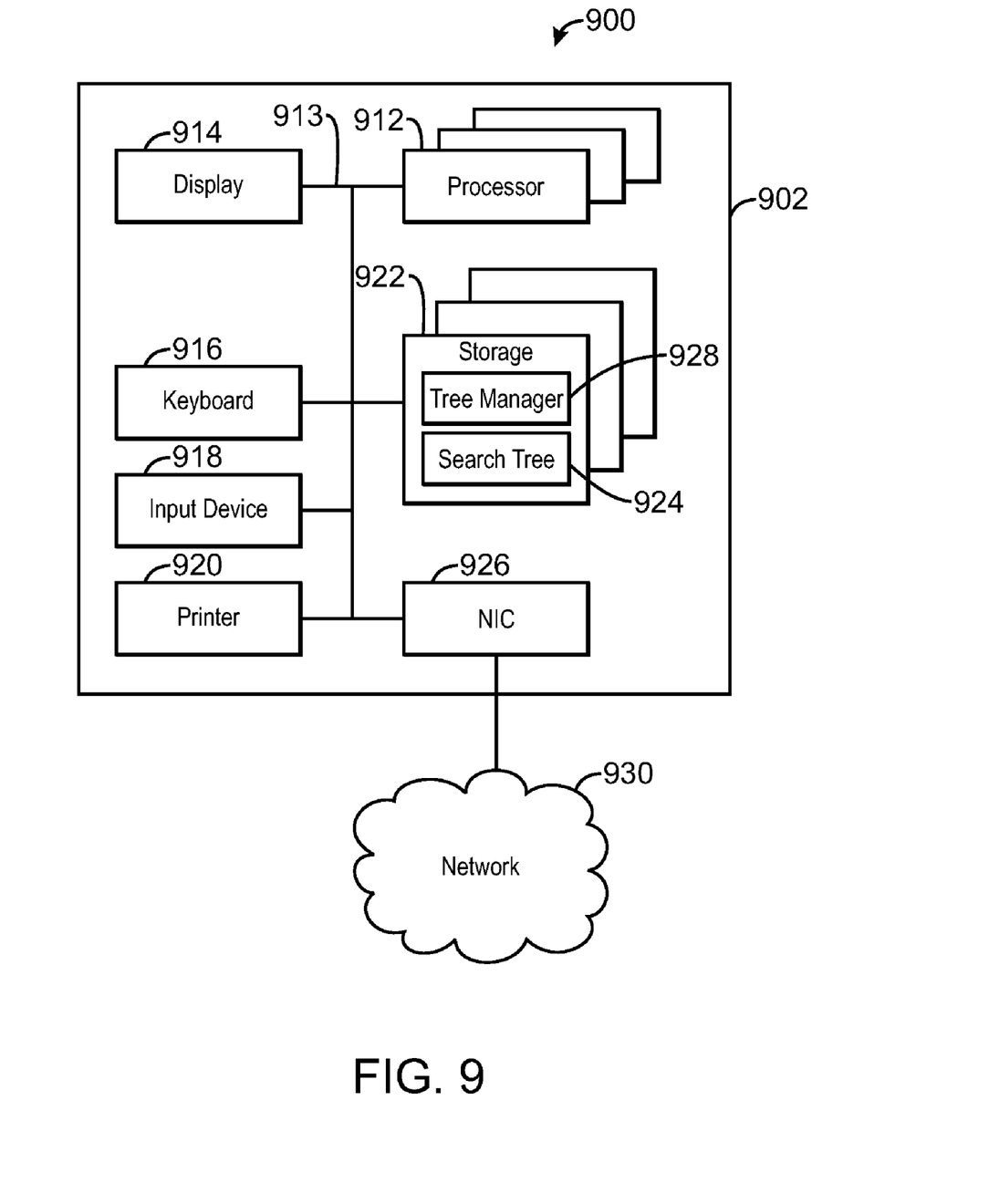
FIG. 9 is a block diagram of a system adapted to perform subsequence matching according to an embodiment of the present invention.

Other nodes besides leaf nodes may include stored subsequences. These nodes are referred to herein as end nodes. As stated previously, the end node may be identified by a keyword end node bit, appended to the presence bit map 214. In such an embodiment, stored subsequences from end nodes may be added to the result set FIG. 9 is a block diagram of a system 900 adapted to perform subsequence matching according to an embodiment of the present invention. Those of ordinary skill in the art will appreciate that the functional blocks and devices shown in FIG. 9 may comprise hardware elements including circuitry, software elements including computer code stored on a non-transitory, machine-readable medium or a combination of both hardware and software elements. Additionally, the functional blocks and devices of the system 900 are but one example of functional blocks and devices that may be implemented in an embodiment of the present invention. Those of ordinary skill in the art would readily be able to define specific functional blocks based on design considerations for a particular electronic device.

The system 900 may include a processor 912 which may be connected through a bus 913 to a display 914, a keyboard 916, one or more input devices 918, and an output device, such as a printer 920. The input devices 918 may include devices such as a mouse or touch screen.

The system 900 may also be connected through the bus 913 to a network interface card (NIC) 926. The NIC 926 may connect the system 900 to a network 930. The network 930 may be a local area network (LAN), a wide area network (WAN), or another network configuration. The network 930 may include routers, switches, modems, or any other kind of interface device used for interconnection.

The system 900 may have other units operatively coupled to the processor 912 through the bus 913. These units may include non-transitory, machine-readable storage media, such as a storage 922. The storage 922 may include media for the long-term storage of operating software and data, such as hard drives. The storage 922 may also include other types of non-transitory, machine-readable media, such as read-only memory (ROM), random access memory (RAM), and cache memory. The storage 922 may include the software used in embodiments of the present techniques.

The storage 922 may include a search tree 924, and a tree manager 928. The search tree 924 may be a searchable data store that contains a number of character strings. In an embodiment of the invention, the search tree 924 may be a tree data structure. Those of ordinary skill in the art will appreciate that a tree data structure may be used to store a set of strings. Moreover, the edges of the search tree 924 may be labeled with strings of characters rather than single characters.

The character strings stored in the search tree may represent words, abbreviations, or other alphabetic representations. In an embodiment of the invention, the strings may represent genetic sequences.

The tree manager 928 may comprise computer-executable software that maintains the search tree 924, and performs subsequence matching. Additionally, the tree manager 928 may store strings in the search tree 924. The tree manager 928 may also take a search string as input, and find all subsequences of the search string that are stored in the search tree 924.

In an embodiment of the invention, the tree manager 928 may find all the subsequences for the search string in linear time. As stated previously, algorithms to find stored subsequences typically have time complexity of $O(n^2)$, which is computationally expensive.

The tree manager 928 may provide advantages in burgeoning fields, such as DNA research. In DNA research, finding subsequences for large search strings, such as genetic sequences, may help identify common genes in different DNA "strings." Performing this task in linear time may help reduce the cost of such research.

Figure 10:
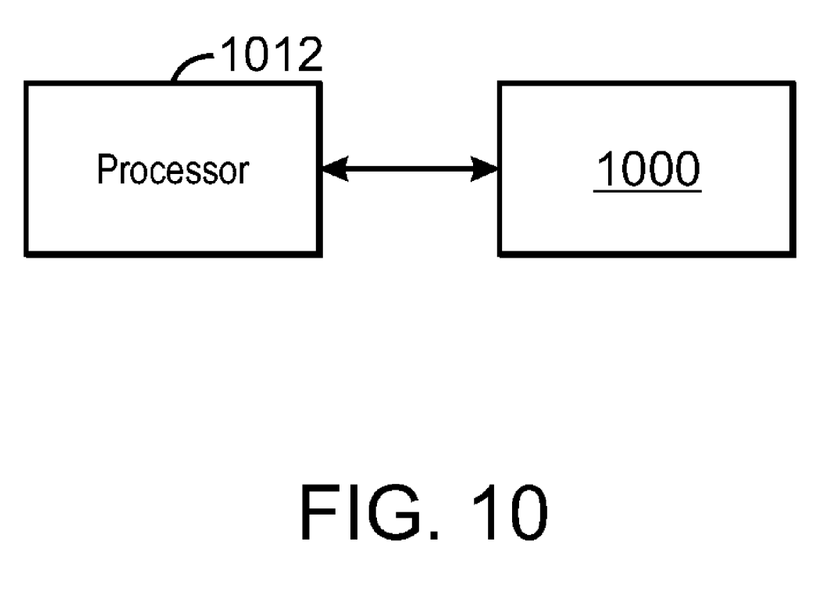
FIG. 10 is a block diagram showing a non-transitory, machine-readable medium that stores machine-readable code adapted to perform subsequence matching according to an embodiment of the present invention.

FIG. 10 is a block diagram showing a non-transitory, machine-readable medium that stores machine-readable instructions executable to perform subsequence matching according to an embodiment of the present invention. The non-transitory, machine-readable medium is generally referred to by the reference number 1000. Moreover, the non-transitory, machine-readable medium 1000 may be included in the storage 922 shown in FIG. 9.

The non-transitory, machine-readable medium 1000 may correspond to any typical storage device that stores computer-implemented instructions, such as programming code or the like. For example, the non-transitory, machine-readable medium 1000 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices.

When read and executed by a processor 1002, the instructions stored on the non-transitory, machine-readable medium 1000 are adapted to cause the processor 1002 to perform subsequence matching. A tree structure may be generated. The tree structure may include a plurality of subsequences for search strings. The tree structure may include a plurality of nodes, wherein each of the plurality of nodes comprises a presence bit map, a sequence bit map, a list of address pointers, a characters over edge string, a keyword end node flag and a leaf flag. The tree structure may also include one or more paths, wherein each path comprises a hierarchical subset of the plurality of nodes, and wherein the hierarchical subset comprises one of a plurality of subsequences of a search string.

The search string may be received. The tree structure may be traversed using the search string, the presence bit map, the sequence bit map, and the list of address pointers for each node. The plurality of subsequences of the search string may be identified in linear time.

What is claimed is:

1. A computer-executed method of subsequence matching, comprising:
   receiving a search string comprising a plurality of subsequences, wherein a tree structure comprises the plurality of subsequences in a corresponding plurality of nodes, and wherein each of the plurality of nodes comprises a presence bit map, a sequence bit map, and a list of address pointers;
   traversing the tree structure using the search string, the presence bit map, the sequence bit map, and the list of address pointers; and
   identifying, in linear time, the plurality of subsequences based on the search string, the presence bit map, the sequence bit map, and the list of address pointers.

2. The method recited in claim 1, wherein the tree structure comprises a path, wherein the path comprises a hierarchical subset of the plurality of nodes, and wherein the hierarchical subset comprises one of the plurality of subsequences.

3. The method recited in claim 1, wherein the presence bit map indicates one or more characters of the one of the plurality of subsequences, wherein the one or more characters are represented in one or more child nodes of a node comprising the presence bit map.

4. The method recited in claim 1, wherein the list of address pointers comprises one or more address pointers corresponding to the one or more child nodes, and wherein the sequence bit map comprises one or more sequence numbers corresponding to:
   the one or more characters; and
   the one or more address pointers.

5. The method recited in claim 1, wherein each of the plurality of nodes comprises a characters over edge string, a keyword end node flag, and a leaf flag.

6. The method recited in claim 5, wherein the characters over edge string comprises a character or a sequence of characters of the one of the plurality of subsequences, wherein the character or the sequence of characters is preceded by a character indicated by a presence bit map of a node that is a parent of the node comprising the characters over edge string.

7. The method recited in claim 5, wherein:
   the leaf flag indicates whether the node is a leaf node or not; and
   the keyword end node flag indicates whether the node comprises a last character of one of the plurality of subsequences.

8. The method recited in claim 1, wherein identifying, in linear time, the plurality of subsequences comprises:
   generating a valid bit map for each character of the search string;
   performing a bitwise AND operation on the valid bit map with the presence bit map of a node;
   determining an address of a child node of the node based on the sequence bit map and the list of address pointers; and
   retrieving the child node.

9. The method recited in claim 2, wherein the path comprises an end node, wherein the end node comprises the one of the plurality of subsequences.

10. The method recited in claim 3, further comprising generating the tree structure.

11. A computer system for subsequence matching, comprising a processor configured to:
    receive a search string;
    traverse a tree structure comprising a plurality of subsequences of the search string, using a presence bit map, a sequence bit map, and a list of address pointers, wherein:
      the presence bit map indicates a presence of one or more characters of one of the plurality of subsequences in a path of the tree structure, wherein the path comprises the one of the plurality of subsequences;
      the list of address pointers comprises one or more address pointers corresponding to one or more nodes of the path; and
      the sequence bit map comprises one or more sequence numbers corresponding to the one or more characters, and the one or more address pointers; and
    identify, in linear time, the plurality of subsequences of the search string, based on the search string, the presence bit map, the sequence bit map, and the list of address pointers.

12. The computer system recited in claim 11, wherein the tree structure, comprises:
    a plurality of nodes, wherein each of the plurality of nodes comprises:
      the presence bit map;
      the sequence bit map;
      the list of address pointers;
      a characters over edge string;
      a keyword end node flag; and
      a leaf flag; and
    a plurality of paths corresponding to the plurality of subsequences of the search string, wherein each of the plurality of paths comprises a hierarchical subset of the plurality of nodes, and wherein the hierarchical subset comprises one of the plurality of subsequences, and wherein the plurality of subsequences comprises all subsequences of the search string in the tree structure.

13. The computer system recited in claim 11, wherein the list of address pointers comprises one or more address pointers corresponding to the one or more child nodes, and wherein the sequence bit map comprises one or more sequence numbers corresponding to:
    the one or more characters; and
    the one or more address pointers.

14. The computer system recited in claim 11, wherein the characters over edge string for a node comprises a character of one of the plurality of subsequences, wherein the character is preceded by a character indicated by a presence bit map of a node that is a parent of the node comprising the characters over edge string.

15. The computer system recited in claim 11, wherein the processor configured to identify, in linear time, the plurality of subsequences of the search string is configured to:
    generate a valid bit map for each character of the search string;
    perform a bitwise AND operation on the valid bit map with the presence bit map of a node;
    retrieve one or more child nodes of the node based on a result of the bitwise AND operation;
    continue the bitwise AND operations and retrieving resultant child nodes until all the subsequences are found.

16. The computer system recited in claim 11, wherein the path comprises an end node, wherein the end node comprises:
    a set keyword end node flag; and
    one of the plurality of subsequences.

17. The computer system recited in claim 16, wherein each of the plurality of nodes comprises a keyword end node flag, wherein the keyword end node flag is set if the end node comprises one of the plurality of subsequences.

18. The computer system recited in claim 11, wherein the processor is configured to generate the tree structure.

19. A non-transitory, machine-readable medium that stores machine-readable instructions executable by a processor to perform subsequence matching, wherein the machine-readable instructions, when executed by the processor:
    generate a tree structure, comprising:
      a plurality of nodes, wherein each of the plurality of nodes comprises a presence bit map, a sequence bit map, a list of address pointers, a characters over edge string, a keyword end node flag and a leaf flag; and
      a plurality of paths corresponding to a plurality of subsequences of a search string, wherein each of the plurality of paths comprises a hierarchical subset of the plurality of nodes, and wherein the hierarchical subset comprises one of the plurality of subsequences, and wherein the plurality of subsequences comprises all subsequences of the search string in the tree structure;
    receive the search string;
    traverse the tree structure using the search string, the presence bit map, the sequence bit map, and the list of address pointers; and identify, in linear time, the plurality of subsequences, based on the search string, the presence bit map, the sequence bit map, and the list of address pointers, wherein the plurality of subsequences comprises all subsequences of the search string in the tree structure.

20. The non-transitory, machine-readable medium recited in claim 19, comprising machine-readable instructions that, when executed by the processor:

generate a valid bit map for each character of the search string;

perform a bitwise AND operation on the valid bit map with the presence bit map of one of the plurality of nodes;

retrieve one or more child nodes of the node based on a result of the bitwise AND operation; and continue to perform bitwise AND operations and retrieve the one or more child nodes until all the subsequences are found.

* * * * *